Patented Mar. 10, 1936

2,033,541

UNITED STATES PATENT OFFICE 2,033,541

MIXED DIPHENYL-ALKYL KETONES

Anderson W. Ralston and Carl W. Christensen, Chicago, Ill., assignors to Armour and Company, Chicago, Ill., a corporation of Illinois No Drawing. Application April 23, 1935, Serial No. 17,874

5 Claims. (Cl. 260—131)

This invention relates to aralkyl ketones and it comprises, as new compounds, ketones having the generic structure

wherein R is a diphenyl radical and R' is an alkyl radical having five or more carbon atoms.

The higher fatty acids, and by that we mean those fatty acids derived from vegetable and animal oils and fats are extremely abundant materials and can be obtained at little expense. They have never, however, been used to any great extent as raw materials for the synthesis of more valuable substances. These fatty acids have been used almost exclusively in the soap industry, for making candles, etc., and in but relatively few instances have they been used as raw materials in what might be termed the "fine" organic chemical field.

We have now discovered a new class of compounds which can be made from the higher fatty acids and which have chemical and physical properties of marked technical and commercial interest. We have discovered that the higher fatty acid chlorides, such as stearyl chloride, myristyl chloride, lauryl chloride, caproyl chloride, and other acid chlorides derived from, and corresponding to the higher fatty acids, can be made to react with diphenyl, or substituted diphenyls, to give aralkyl ketones having valuable properties which suit them for use in many technical applications. These aralkyl ketones are waxy solids and can be crystallized from organic solvents such as benzene, alcohol and others, to give pure ketones. The crystalline products, when melted and allowed to cool, yield substances of clearly defined "waxy" character, appearance and "feel". We have discovered that they are excellent dielectrics and can be used in electrical insulation. We have also discovered that these new substances are desirable constituents in waxing and polishing compounds. When added to lubricating oils, the ketones of the present invention confer beneficial properties on the oil.

In its broad aspects, our invention comprises new products having the generic formula

wherein R is the diphenyl radical which may be substituted or not, and R' is an alkyl radical containing the alkyl residue of a higher fatty acid. Thus, as an example, one of the new products falling within the scope of our invention is diphenyl heptadecyl ketone, which can be written structurally as follows:

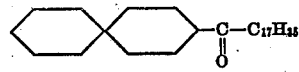

In this case, the $C_{17}H_{35}$, or heptadecyl radical, is the alkyl residue of stearic acid, $C_{17}H_{35}COOH$. This particular ketone has a melting point of 108–109° C.

Other typical ketones falling within the generic scope of our invention are:

diphenyl tridecyl ketone (melting point 102-103° C.)

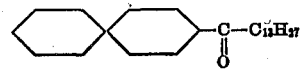

diphenyl undecyl ketone (melting point 97-98° C.)

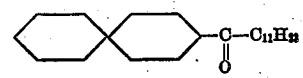

p-methyldiphenyl heptadecyl ketone (melting point 105-106° C.)

p-chlordiphenyl heptadecyl ketone (melting point 96-97° C.)

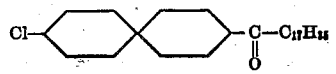

All of the ketones of our invention can be made by the Friedel-Crafts reaction or by the Grignard synthesis. We find that the Friedel-Crafts gives high yields.

Thus, for example, when we wish to make diphenyl tridecyl ketone, we start with diphenyl and myristyl chloride. The myristyl chloride can be made in any of the known ways from myristic acid. Generally the myristic acid is reacted with phosphorous pentachloride or other chlorinating reagent commonly used for converting aliphatic carboxylic acids to their corresponding acid chlorides. We then prepare a mixture containing about 35 parts by weight of diphenyl, 50 parts by weight of myristyl chloride, and about 100 parts by weight of carbon disulphide. This mixture is cooled in an ice bath and about 50 parts by weight of aluminum chloride (dry) are slowly added with stirring until there is no further evolution of hydrochloric acid. The reaction mixture is then poured into a mixture of ice and dilute hydrochloric acid to hydrolyze the complex aluminum compound formed in the reaction.

Finally the resulting acid mixture is placed in a flask and subjected to steam distillation. This removes excess diphenyl from the reaction products. During the steam distillation, the diphenyl tridecyl ketone separates from the aqueous reaction mixture in the distilling flask as an oily supernatant liquid. It does not distill over with the carbon disulphide and can be separated from the aqueous solution of aluminum chloride in the distilling flask by simple decantation. It is then taken up in carbon tetrachloride, benzene, or other organic solvent and crystallized therefrom.

In the above example the ratio of acid chloride to diphenyl is about 2 molecular weights of acid to 3 of diphenyl. We find it best to use an excess of the diphenyl but the excess is of course recovered during the steam distillation. Yields are high. In the above example the yield is 97 percent of theory.

In a similar manner we can start with substituted diphenyls such as chlorinated diphenyls, alkyl substituted diphenyls and others. Likewise, as stated, we can start with any acid chloride of the higher fatty acids. Generally we start with the acid chlorides of fatty acids having twelve or more carbon atoms since these fatty acids are readily available and cheap. Our invention is therefore not limited to the specific compounds described above, since we are the first to describe aralkyl ketones, or mixed ketones, in which the aryl group is a diphenyl radical and the alkyl group is the alkyl residue of a higher fatty acid. And by higher fatty acid we mean those acids having six or more carbon atoms.

Having thus described our invention, what we claim is:

1. Aralkyl ketones having the structural formula

wherein R is a diphenyl radical and R' is an alkyl radical having at least five carbon atoms.

2. Aralkyl ketones having the structural formula

wherein R is a diphenyl radical and R' is an alkyl radical having at least eleven carbon atoms.

3. A diphenyl heptadecyl ketone.
4. A diphenyl tridecyl ketone
5. A diphenyl undecyl ketone.

ANDERSON W. RALSTON.
CARL W. CHRISTENSEN.